United States Patent [19]
Harris et al.

[11] Patent Number: 6,149,123
[45] Date of Patent: Nov. 21, 2000

[54] INTEGRATED ELECTRICALLY OPERABLE MICRO-VALVE

[75] Inventors: James M. Harris, Saratoga; Bradford A. Cozad, Newark; Dean Allyn Hopkins, Jr., San Jose; John S. Fitch, Newark, all of Calif.

[73] Assignee: Redwood Microsystems, Inc., Menlo Park, Calif.

[21] Appl. No.: 08/937,611

[22] Filed: Sep. 25, 1997

Related U.S. Application Data

[63] Continuation-in-part of application No. 08/720,099, Sep. 27, 1996, Pat. No. 5,865,417.

[51] Int. Cl.$^7$ .................................................... F16K 31/02
[52] U.S. Cl. ........................ 251/11; 251/129.06; 338/23
[58] Field of Search ............................ 251/11, 129.06, 251/900, 129.02; 137/486, 487.5; 338/23; 60/530

[56] References Cited

U.S. PATENT DOCUMENTS

| | | | |
|---|---|---|---|
| 2,388,696 | 11/1945 | Lacart et al. | 251/129.02 X |
| 2,833,507 | 5/1958 | Dube et al. | 251/11 |
| 3,198,481 | 8/1965 | Bryant | 251/900 X |
| 4,821,997 | 4/1989 | Zdeblick . | |
| 4,824,073 | 4/1989 | Zdeblick . | |
| 4,906,840 | 3/1990 | Zdeblick et al. . | |
| 4,943,032 | 7/1990 | Zdeblick . | |
| 4,966,646 | 10/1990 | Zdeblick . | |
| 5,029,805 | 7/1991 | Albarda et al. | 251/129.06 X |
| 5,058,856 | 10/1991 | Gordon et al. . | |
| 5,074,629 | 12/1991 | Zdeblick . | |
| 5,190,068 | 3/1993 | Philbin | 137/487.5 X |
| 5,238,223 | 8/1993 | Mettner et al. | 251/129.06 X |
| 5,270,125 | 12/1993 | America et al. . | |
| 5,671,905 | 9/1997 | Hopkins, Jr. . | |

FOREIGN PATENT DOCUMENTS

| | | |
|---|---|---|
| 0 261 972 B1 | 12/1992 | European Pat. Off. . |
| 0 587 912 | 3/1994 | European Pat. Off. . |
| 44 22 971 | 1/1996 | Germany . |

*Primary Examiner*—Kevin Lee
*Attorney, Agent, or Firm*—Pennie & Edmonds LLP

[57] ABSTRACT

Integrated, electrically operable micro-valves are formed to control fluid flow and pressure. These valves convert electrical energy to mechanical energy through an energy conversion device having a sealed cavity with a flexible wall. The sealed cavity contains a fluid that expands and contracts as it is heated or cooled, thus causing the flexible wall to move. Movement of this wall or membrane is used to move a valve element and dynamically control the opening or closing of a valve port over a predetermined range.

12 Claims, 12 Drawing Sheets

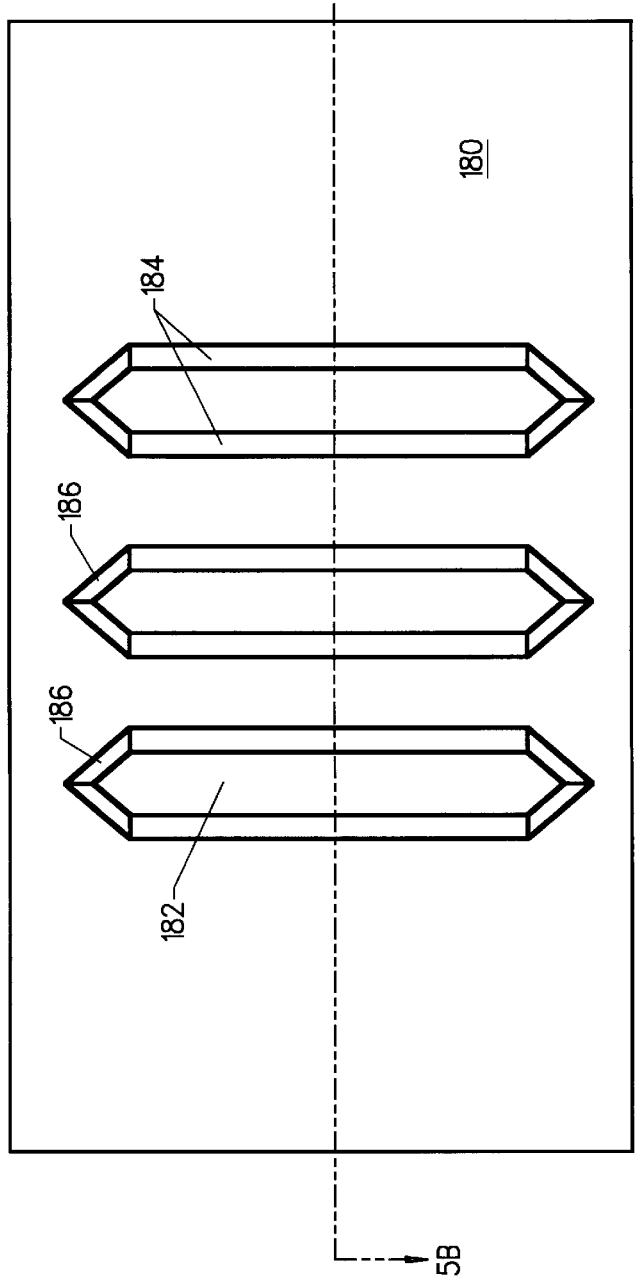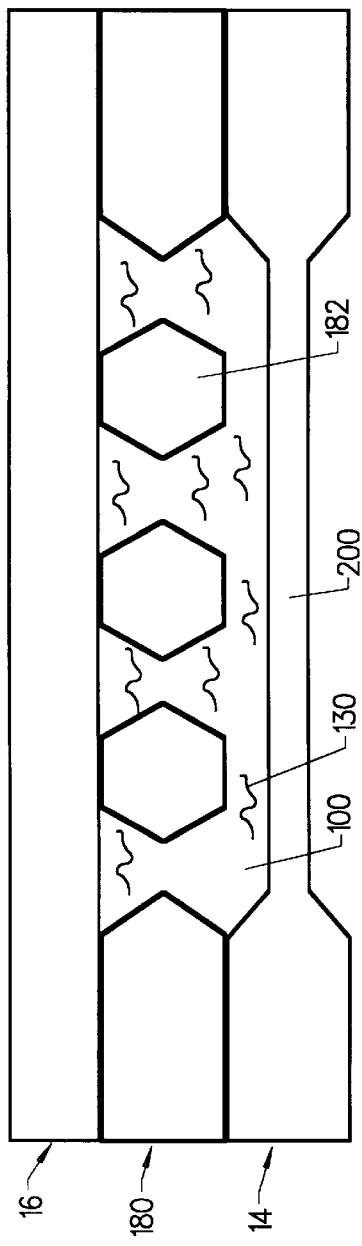

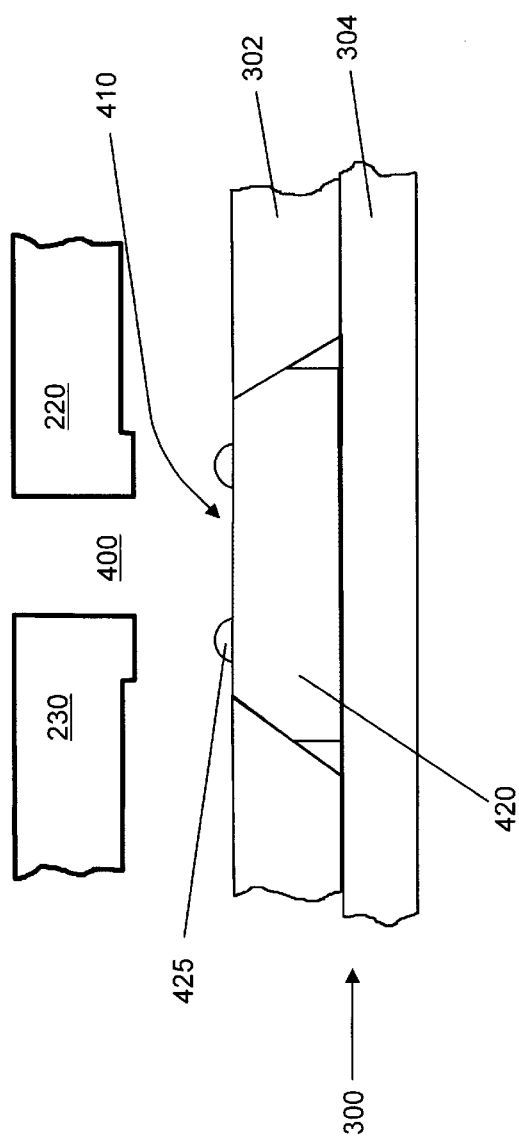
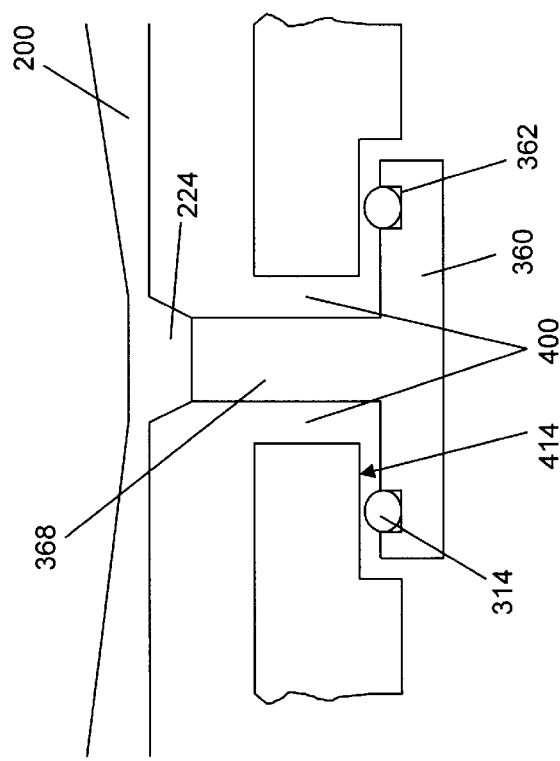
FIG. 8A
FIG. 10

INTEGRATED ELECTRICALLY OPERABLE MICRO-VALVE

CROSS-REFERENCE TO RELATED APPLICATION

This application is a continuation-in-part of U.S. patent application Ser. No. 08/720,099 entitled "INTEGRATED ELECTRICALLY OPERABLE NORMALLY CLOSED VALVE" filed on Sep. 27, 1996, now issued as U.S. Pat. No. 5,865,417, and assigned to the assignee of the present invention.

BACKGROUND OF THE INVENTION

1. Field of the Invention

The invention pertains to the field of integrated, electrically operable micro-valves and, more particularly, to the field of low leak rate integrated micro-valves for industrial, corrosive and ultra-clean applications.

2. Description of the Related Art

Micromachined integrated valves are known in the prior art. Examples of various embodiments of such normally open valves are given in U.S. Pat. Nos. 4,821,997 and 4,824,073 and 4,943,032 and 4,966,646 by Mark Zdeblick, assigned to Stanford University, hereinafter referred to as the "Zdeblick" patents, the disclosures of which are hereby incorporated by reference. Such valves generally include a three tier structure which uses the top two tiers to form a sealed cavity with a fluid, having a low boiling point and/or high expansion coefficient, trapped therein, and having one wall of that cavity formed as a thin, flexible membrane. The top two tiers can be silicon, quartz or glass substrates, or any other appropriate material. Typically at least one tier or substrate is silicon to take advantage of silicon micromachining techniques to form the cavity and flexible membrane. The valves of the "Zdeblick" patents also include a resistive element formed on an interior surface of the sealed cavity. This element has electrical connections to a current source to provide for an electrical input through the resistor causing a resultant heating effect. The bottom tier typically has a valve seat and port formed therein. In this manner, fluid flow can be halted by closing the valve port to stop flow across the valve seat and through the port. In the "Zdeblick" patents, when current is passed through the resistor, the trapped fluid is heated causing the flexible membrane to flex far enough to come into contact with the valve seat formed of the lower body. Thus fluid flow is cut off between the input channel and the output channel through the port.

Normally open valves are suitable for some applications, but in other applications normally closed valves are needed, that is valves wherein no flow from the input channel to the output channel occurs in the de-energized state. One example of such a normally closed valve is the Fluistor™ (trademark of Redwood Microsystems, Inc. of Menlo Park, Calif.) Microvalve (NC-105) manufactured by Redwood Microsystems, Inc. Referring to FIG. 1, a simplified representation of this valve 5 in the de-energized state is shown. In the Fluistor™ valve 5 a flexible membrane 20 is formed from a middle layer or substrate 14. Flexible membrane 20 also serves as a wall of a cavity 26 formed between the middle substrate 14 and an upper layer or substrate 16. Cavity 26 has a resistive element or heater 30 formed therein to provide for heating a fluid 28 (represented by "squiggly" lines) that is sealed within cavity 26. Fluid 28 is selected so that when heated it expands to cause flexible membrane 20 to flex or move. This movement is coupled to a lower layer or substrate 12 through a mechanical coupling or pedestal 22. Where substrate 12 is fixed, as in the Fluistor™ NC-105, movement of flexible membrane 20, coupled with the placement of pedestal 22, results in middle and upper substrates 14 and 16, respectively, moving away from lower substrate 12. Thus, substrate 12 separates from middle substrate 14, and an outlet port 44, formed through substrate 12 is unblocked or opened at a valve seat region 40. In this manner, the outlet port 44 is opened and placed in fluidic communication with an inlet port 42.

The Fluistor™ valve works well for controlling the flow of non-corrosive fluids and/or where leak rates of no less than approximately $1 \times 10^{-4}$ cc-Atm/sec of Helium (cubic centimeter-Atmospheres per second as calibrated using helium) are required. However, it is not designed for applications requiring the control of corrosive fluids and/or applications requiring leak rates of $1 \times 10^{-6}$ cc-Atm/sec of Helium or less. In addition, like the valves of the "Zdeblick" patents, the Fluistor™ valve uses the material of flexible membrane 20, or a contiguous extension thereof, to directly seal port 44. Such direct use of membrane 20 limits the design possibilities of valve 5.

Accordingly, there is a need for an integrated, micro-valve, which can be used to control corrosive fluids. There is also a need for an integrated, micro-valve that can achieve a leak rate of $1 \times 10^{-6}$ cc-Atm/sec of Helium or less. In addition, there is a need for an integrated, micro-valve that can control corrosive fluids while achieving a leak rate of $1 \times 10^{-6}$ cc-Atm/sec of Helium or less. Finally there is a need for normally open and normally closed micro-valves that provide for the above mentioned needs without using the flexible membrane as an essentially direct sealing device for the valve port; in this manner, increasing the design choices and range of potential applications for the micro-valve.

SUMMARY OF THE INVENTION

An integrated, micro-valve, also commonly referred to as a microminiature valve, uses a thin flexible membrane with an actuator to move a valve element. The thin membrane moves in response to energy input to an energy conversion block. Thus in some embodiments, electrical energy to the energy conversion unit is input to a resistive heater; the thermal energy generated by the heater causes fluid trapped in a sealed cavity to expand; the expanding fluid deflects a flexible wall or membrane. In some embodiments, the energy conversion unit provides cooling in addition to heating.

The flexible membrane is coupled to the valve element through an actuator and positioned proximate to one or more intermediary ports. Thus, movement of the membrane causes the valve element to move and either open or close each port. Each port is fluidically coupled to passageways serving as input and output channels for the valve and each port encompasses a valve seat. In some embodiments, the valve seat is formed as part of the valve element and in other embodiments it is formed as part of the valve port. In some embodiments, the valve seat has a compliant sealing surface to provide an enhanced seal. In some embodiments a ridge is formed on the surface(s) opposing the compliant sealing surface(s) thus providing a relatively narrow edge to compress the compliant sealing surface when closing the port. In this manner, embodiments having compliant sealing surfaces can have lower leak rates than embodiments without such surfaces. In some embodiments, a spring or other apparatus for force applying device is employed to apply force to the valve element. In some embodiments of the present invention, the valve is configured as a normally closed valve, in other embodiments the valve is configured as a normally open valve. In some embodiments of the present invention, surfaces that contact the fluidic material controlled by the valve are coated with an inert material. In this manner, valves for controlling the flow rate of corrosive and/or ultra-pure fluids are fabricated.

In some embodiments of the present invention sensing devices are integrated with the valves. In some embodiments these sensing devices are flow sensors, while in other embodiments these sensing devices are pressure sensors. Thus where valves in accordance with embodiments of the present invention additional have integrated sensing devices to provide dynamic feedback to the energy input source of the energy conversion block, these valves can dynamically control flow rate or pressure.

BRIEF DESCRIPTION OF THE DRAWINGS

The present invention may be better understood, and its numerous objects, features and advantages made apparent to those skilled in the art by referencing the accompanying drawings. For ease of understanding and simplicity, common numbering of elements within the illustrations is employed where an element is essentially the same between illustrations.

FIG. 5A is a planar view of a portion of an alternate heater configuration in accordance with the present invention;

FIG. 5B is a cross-sectional view of another alternate cavity and heater configuration, employing the heater configuration of FIG. 5A, in accordance with the present invention;

FIGS. 8A and 8B are cross-sectional views of alternative intermediary port configurations in accordance with the present invention;

FIG. 10 is a cross-sectional view of still another alternate intermediary port configuration in accordance with the present invention.

DETAILED DESCRIPTION

Embodiments of the present invention will be described with reference to the aforementioned figures. These drawings are simplified for ease of understanding and description of embodiments of the present invention only. Various modifications or adaptations of the specific methods and or structures that represent embodiments of the present invention may become apparent to those skilled in the art as these embodiments are described. All such modifications, adaptations or variations that rely upon the teachings of the present invention, and through which these teachings have advanced the art, are considered to be within the spirit and scope of the present invention. For example, in some embodiments of the present invention, a valve with a single valve port is employed whereas in other embodiments multiple valve ports can be employed.

Details of processes that may be used to fabricate portions of embodiments of integrated valve structures is generally known to those of ordinary skill in the art. In addition, the "Zdeblick" patents (U.S. Pat. Nos. 4,821,997 and 4,824,073 and 4,943,032 and 4,966,646), all of which have been previously incorporated by reference herein, provide processing descriptions. Thus, only some processing details, believed not readily apparent are described herein.

Figure 1:
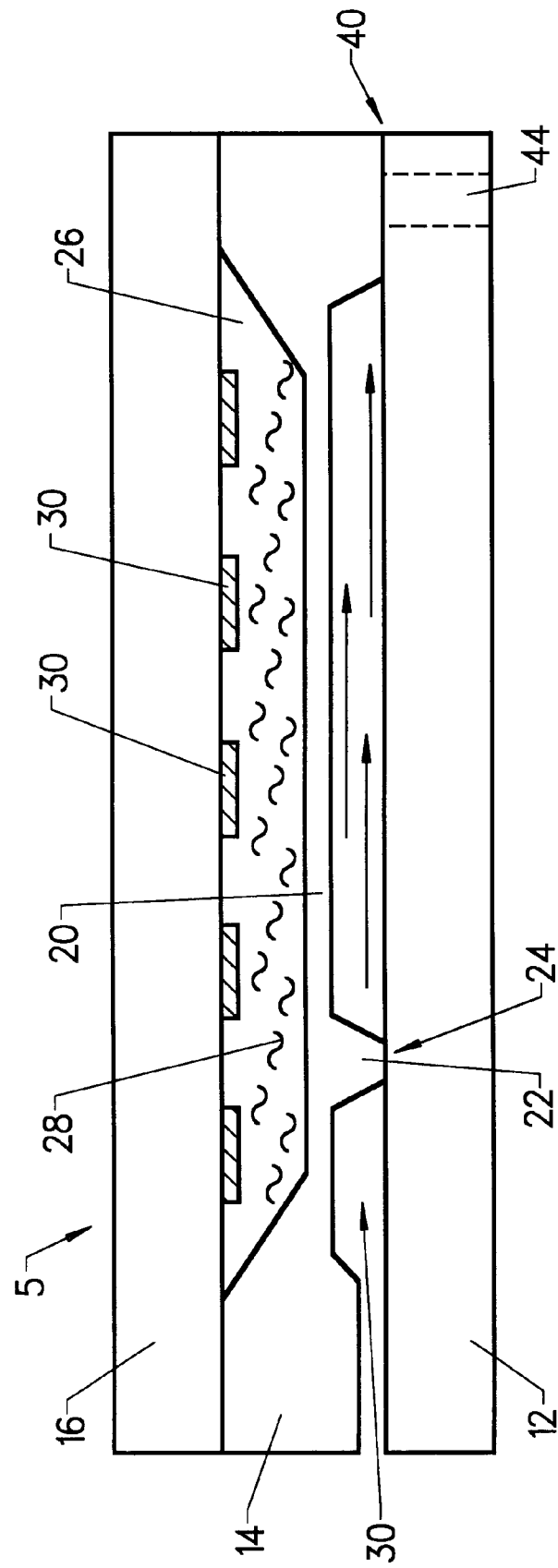
FIG. 1 is a simplified cross-sectional representation of a Fluistor™ Microvalve as known in the art.
Figure 2:
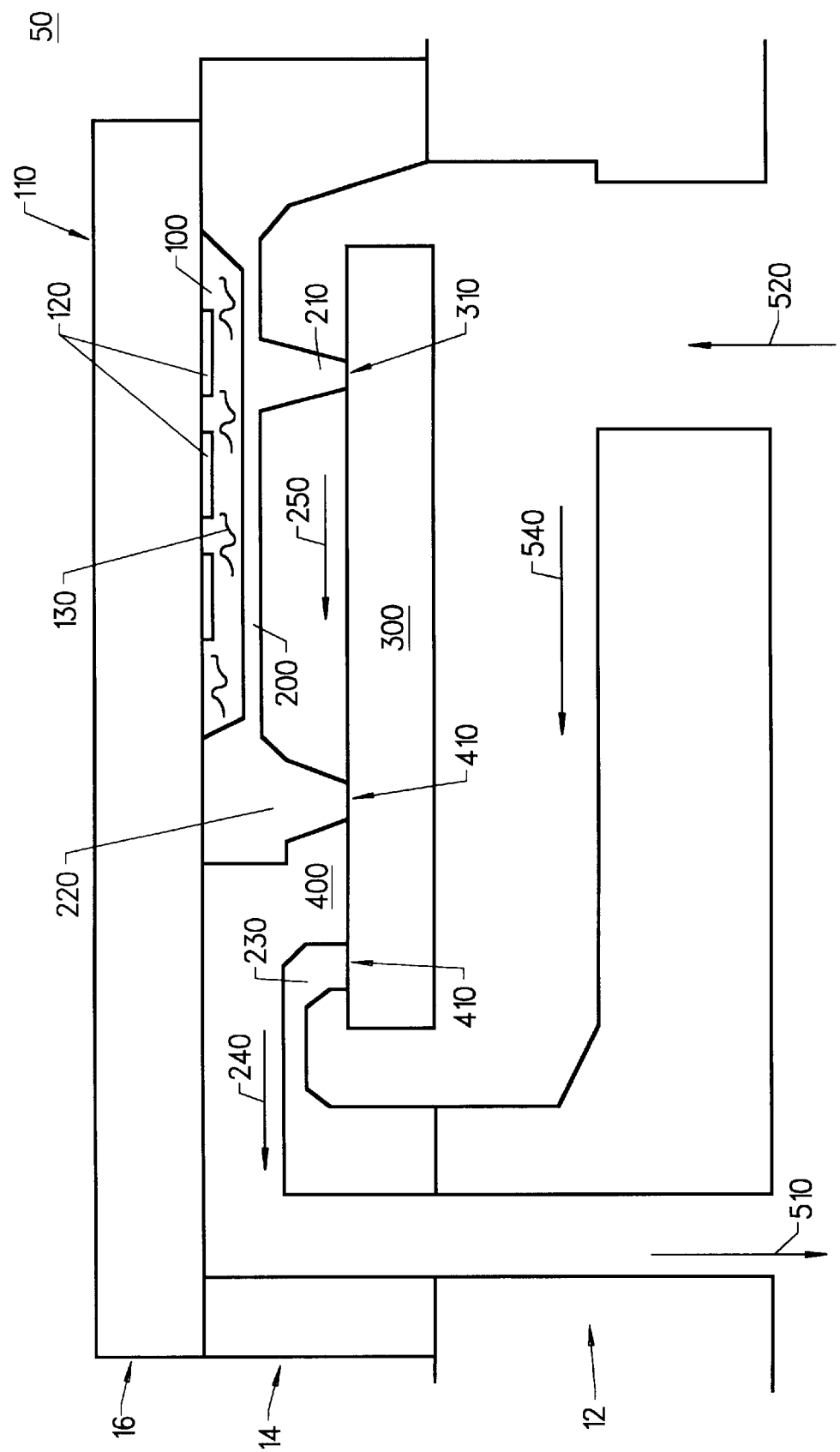
FIG. 2 is a simplified cross-sectional representation of an embodiment of an integrated, normally closed, electrically operable, valve in accordance with the present invention.

Referring to FIG. 2, a simplified cross-sectional representation of a portion of an integrated, normally closed, electrically operable, valve 50 fabricated in accordance with an embodiment of the present invention is shown. As was described for the Fluistor™ valve of FIG. 1, valve 50 is formed using upper, middle and lower layers or die, 16, 14 and 12, respectively. An essentially flat upper layer 16 is used to form one wall of a sealed cavity 100. A resistive heating element 120, is fixed to layer 16 and positioned within cavity 100. Another wall of cavity 100 is fabricated by forming a flexible membrane 200 of a portion of middle layer 14. Sealed cavity 100 is filled with a working fluid 130 (represented by squiggly lines) which is typically a dielectric material, for example a fluorocarbon, that expands when heated and contacts when cooled. Thus, when electrical energy is supplied to heating elements 120 and working fluid 130 heated, fluid 130 expands and causes membrane 200 to flex or deflect outward.

In addition to forming a wall of cavity 100, flexible membrane 200 is also positioned adjacent to a valve element or valve member 300. Membrane 200 is mechanically coupled to valve member 300 through a pedestal 210 at a coupling point 310. This coupling of flexible membrane 200 to valve member 300 advantageously provides for transfer of the movement of membrane 200 to valve member 300.

Figure 2A:
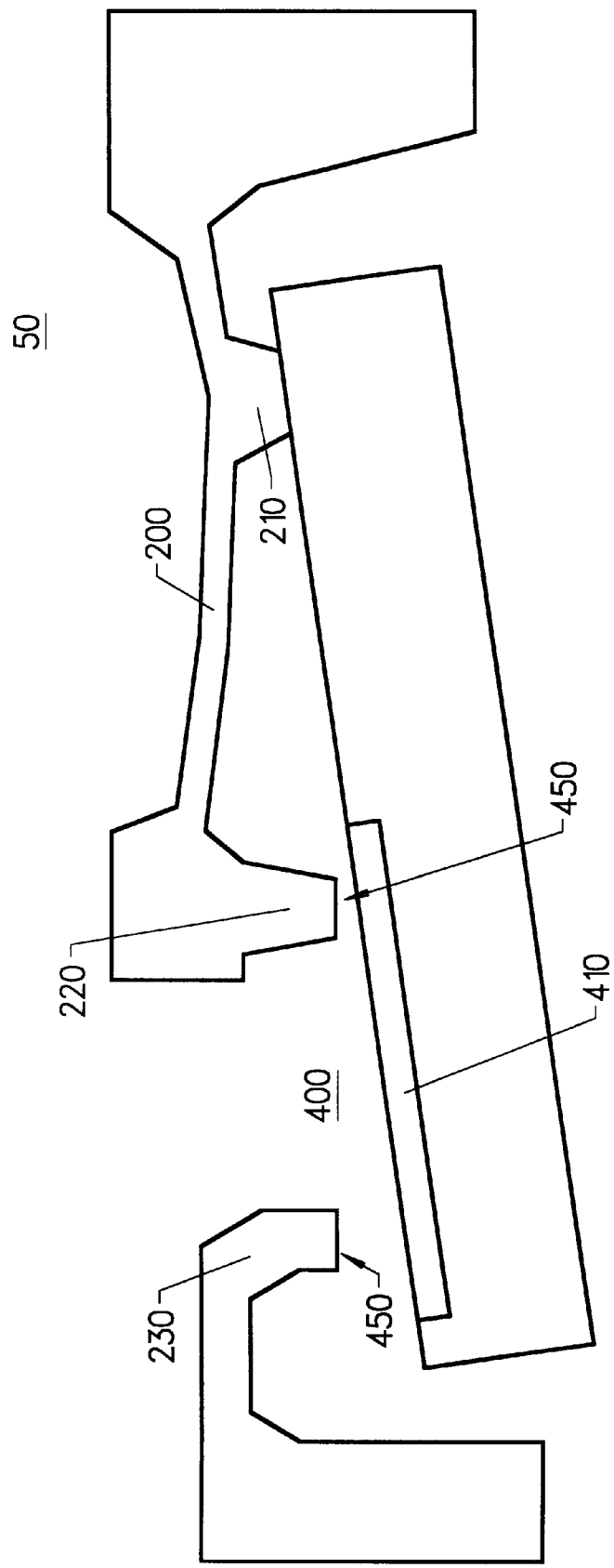
FIG. 2A is an enlarged view of a portion of the valve depicted in FIG. 2.

An intermediary or valve port 400 is formed from a valve-end portion 220 of flexible membrane 200 and valve port portion 230 of middle layer 14. Portions 220 and 230 define the size and shape of port 400 as well as provide a peripheral seal area 450 about port 400 as indicated in the enlarged view of port 400, membrane 200 and element 300 of FIG. 2 that is depicted in FIG. 2A. Some embodiments of valve port 400 have a valve seat region 410 formed within valve element 300. In other embodiments, a valve seat region (not shown) is formed in peripheral seal area 450. In the embodiment of FIG. 2 and 2A, when valve 50 is de-energized, peripheral seal area 450 and valve element 300 are in intimate contact; thus port 400 is closed or seated. This type of valve 50 is referred to as a normally closed valve. In other embodiments, when valve 50 is de-energized, peripheral seal area 450 and valve element 300 are spaced apart (not shown); thus port 400 is open. This type of valve is referred to as a normally open valve.

An outlet port 510 and an inlet port 520 are formed in lower layer 12. Outlet port 510 is fluidically coupled to valve port 400 through an outlet channel 240. Inlet port 520 is fluidically coupled to port 400 through inlet channels 540 and 250. Thus, while port 400 is closed, inlet 520 is isolated from outlet 510. However, when fluid 130 is heated, it expands and deflects or moves flexible membrane 200. This movement causes membrane 200 to push on element 300, through pedestal 210, and valve element 300 is rotated or moved away from valve seat region 410. Thus, opening valve port 400. In this manner, outlet port 510 is brought into fluidic communication with inlet port 520, through channels 240, 250 and 540.

The various portions of valve 50 described, can be seen to make up several discrete functional blocks. Thus an energy conversion block converts electrical energy to mechanical energy by heating working fluid 130 and causing membrane 200 to deflect. An intermediary valve block is coupled to this mechanical energy through an actuator, thus causing movement that is used to open and/or close a valve port. Finally, a fluid communication and guiding block is coupled to the intermediary port to provide fluidic communication within the structure. As seen in FIG. 2, these functional blocks can be fabricated from one or several of layers 12, 14 and 16. Thus the embodiment depicted in FIG. 2 has an energy conversion block that encompasses portions of upper layer 16 and middle layer 14. In a similar manner the fluidic communications block encompasses portions of all three layers.

Returning to FIG. 2, it can be seen that flexible membrane 200 should be both thin enough to be flexible and thick enough to have sufficient strength so as not to fracture under forces normally encountered during operation of valve 50. In addition, flexible membrane 200 forms a part of both sealed cavity 100 and channel 250. Thus, membrane 200 will contact both working fluid 130 and any fluidic material that valve 50 will control. These portions of membrane 200 that contact the controlled fluidic material, are commonly referred to as "wetted surfaces". In the embodiment of FIG. 2, membrane 200 is formed from middle layer 14, and it can be seen that various other parts of layer 14 are coupled to parts of both layers 12 and 16. Therefore selection of a material for layer 14 will consider, among other things, these requirements of strength, flexibility and compatibility of membrane 200 as well as coupling or bonding of layer 14 to materials selected for layer 12 and 16. In some embodiments of the present invention, it has been found advantageous to select a silicon material for layer 14, although other appropriate materials can be selected.

Valve element 300 is typically fabricated separate from the fabrication of portions of the valve made from layers 14 or 16 and mounted, mechanically coupled to pedestal 210, adjacent valve port 400. As described for layer 14, element 300 will have "wetted surfaces", and will require sufficient strength to close valve port 400. Additionally, in some embodiments of the present invention, valve member 300 also provides some or all of a restoring force that opposes the movement caused by flexible membrane 200. Thus, as will be seen, the material of element 300 should be capable of providing this restoring force. While it will be seen that the form of valve element 300 can vary from the essentially planar form depicted in FIG. 2, it has been found advantageous to form element 300 from a silicon material for its compatibility with layer 14 and availability of silicon micromachining techniques.

In the embodiment of FIG. 2, lower layer 12 is employed to form some or all of outlet and inlet ports 510 and 520, respectively, and channel 540. Thus, as described for layer 14, layer 12 will have "wetted surfaces", and the material of layer 12 should be compatible with the fluidic material valve 50 controls. Layer 12 also serves as a mounting structure for other portions of valve 50 as well as for coupling valve 50 to the systems within which it can be used. Thus layer 12 should be sufficient strong and durable for such mounting functions. In addition, in some embodiments of the present invention, an auxiliary force-providing device (not shown) is used to apply force to valve element 300. Where such force-providing devices are employed, they often are mounted using layer 12. While it has been found that a silicon material advantageously provides the characteristics required for layer 12, other appropriate materials can also be selected. For example, in some embodiments various ceramic materials such as alumina are employed and in other embodiments a borosilicate glass or quartz material is employed.

In the embodiment of FIG. 2, layer 16 serves to support and position heating elements 120 and form sealed cavity 100. In addition, it serves to form a portion of channel 240 thus having some "wetted surface". It will be understood, that where elements 120 can only heat working fluid 130, the cooling of fluid 130 is accomplished, in significant part, through its contact with layer 16. Thus in some embodiments of the present invention, a material with good thermal conductivity is selected for layer 16. However, where heating elements 120 are electrical resistance elements, the material of layer 16 is typically a dielectric material to prevent an electric short of elements 120. In some embodiments, working fluid 130 is heated using radiant energy supplied by a remote source. In such embodiments, a material transparent to this radiant energy is selected for layer 16. Layer 16 can therefore encompass a variety of materials including, but not limited to, quartz, borosilicate glass, ceramic, sapphire, silicon or plastic. Thus, it will be understood, that embodiments of the present invention encompass a variety of materials that can be selected for valve element 300 and each of layers 12, 14 and 16, and that selection of a specific material for element 300 or a specific layer is a design choice taking into account a number of factors as discussed herein. It will be further understood, that all such design choices are within the scope of the present invention.

As previously mentioned, membrane 200 has both flexibility and strength. However, an optimal balance of the flexibility and strength of a specific membrane 200 can vary for each specific application. Thus in some embodiments of the present invention, flexibility can be a primary concern, while in others strength can be more important than flexibility. While the material selected for layer 14 is an important factor in the strength and flexibility of membrane 200, the balancing of these two characteristics is also accomplished by varying the thickness and shape of flexible membrane 200. Thus, where layer 14 is [100] silicon, a typical thickness for membrane 200 is approximately 50 $\mu$m (microns). However, membrane 200 can be either thicker or thinner, and a range of thickness from approximately 10 to 100 $\mu$m has been found to be advantageous. In addition, it has been found that varying the shape or cross-sectional profile of membrane 200 can influence the balance between flexibility and strength for membrane 200. Therefore, while some embodiments of the present invention have a flexible membrane 200 with an essentially uniform thickness, in other embodiments, membrane 200 is not of uniform thickness. For example, in some embodiments membrane 200 has a stepped cross-sectional profile of varying thickness. In other embodiments, membrane 200 is formed with a gradual variation in thickness, decreasing from edge to center. Thus, any cross-sectional profile, designed to meet the requirements of a specific application, can be employed to provide the correct balance between flexibility and strength for a specific application of valve 50.

Various methods for the fabrication of the several structures that form valve 50, as depicted in FIG. 2, are known. However, these as methods are beyond the scope of the present invention, only examples of the methods will be disclosed. Thus, for example, the methods of fabrication described in the "Zdeblick" patents, previously incorporated by reference herein, can be used to form the structures of valve 50. In addition, other methods of fabrication, such as EDM (electro-discharge machining), electrochemical etching, sand blasting, molding, coining, LIGA and diamond machining, can also be employed. It will be understood, that the realization of the benefits of the present invention does not depend on the method of fabrication employed. Thus, any one or all of the methods mentioned above or described in the "Zdeblick" patents can be used to form the structures described herein.

Still referring to FIG. 2, cavity 100 is depicted as filled with working fluid 130. One criteria for selecting working fluid 130 is its coefficient of expansion. Thus where working fluid 130 has a large coefficient, the greater the range of movement it will induce in membrane 200 over any projected operating temperature range. As previously mentioned, fluid 130 is chemically inert to the materials of cavity 100. Materials that are chemically inert with respect to one another are defined as having essentially no chemical reactions with one another. In addition, typically the material selected for fluid 130 should remain liquidus over the temperature range projected for any valve 50, although in some embodiments some portion of fluid 130 is vaporous. It has been found that a wide variety of materials meet these requirements; thus water, ethanol or other alcohols, and many of the members of the fluorocarbon family, for example, in some embodiments materials marketed under the trademark Fluorinert®, are used for working fluid 130.

While not shown in FIG. 2, cavity 100 is typically filled through a fill orifice that is subsequently hermetically sealed with orifice seal element. In some embodiments, cavity 100 is filled and sealed with fluid 130 at the highest ambient temperature likely to be experienced by valve 50 during its operation. In other embodiments cavity 100 is filled and sealed with fluid 130 at the highest pressure likely to be experienced by valve 50 during its operation. And in some embodiments a combination of a specific temperature and pressure are employed. In this manner, the maximum movement is obtained for flexible membrane 200.

In some embodiments, valve 50 is fabricated for ultra-clean processes as are commonly found, for example, in the semiconductor or pharmaceutical industries. As previously mentioned, in the embodiment depicted in FIG. 2, portions of valve element 300, upper layer 16, middle layer 14 and bottom layer 12 have "wetted surfaces" that contact the fluidic material controlled by valve 50. To insure compatibility with such ultra-clean processes, specific embodiments of valve 50 are advantageously fabricated having these "wetted surfaces" mode of or coated with one or more materials that are compatible with a specific process. Thus for applications in the pharmaceutical industry, "wetted surfaces" coated with a Teflon® material are appropriate. While some semiconductor industry applications can also employ such Teflon® coated surfaces, valve 50 can also be fabricated with its "wetted surfaces" coated with chromium, silicon carbide, silicon nitride, silicon oxide or diamond like carbon to withstand environments not suitable for Teflon®. Thus a family of valves, structurally similar to one another, can be fabricated with "wetted surfaces" coated with different materials for specific compatibility to a specific application. In addition, as valve 50 is fabricated from one or more layers or die, selection of a material for the "wetted surfaces" should be compatible with any of the bonding processes used to couple the layers to one another. For example, if an anodic bonding process is selected to couple a silicon layer 14 to a borosilicate layer 16 having its "wetted surfaces" coated with a chromium barrier layer (not shown), the chromium should be removed from the bonding surfaces of layer 16 to obtain a bond and effect coupling. However, other bonding processes, such as using low ionic content epoxies, fusible glasses, and the like, can also be employed.

Resistive heaters 120 can be formed using any of the commonly used resistive materials that are compatible with the specific bonding process selected. For example, where an anodic process is employed for bonding a borosilicate glass upper layer or die 16 to a silicon middle die 14, it has been found desirable to form heater elements 120 using a first layer of titanium to provide adhesion to die 16 for a subsequent layer of platinum that forms the resistive element. Other types of resistive elements can also be employed. Thus, in some embodiments, a resistive material having a Positive Temperature Coefficient (PTC) can be employed. As known the resistance of such PTC materials will increase as the temperature of working fluid 130 increases, thus advantageously reducing power consumption and limiting over-temperature of elements 120. An example of such a PTC material is $BaTiO_2$ (barium titinate). In some embodiments of the present invention, multiple, separately controlled, heating elements 120 are employed. For example, it has been found that a first heater can be used to provide a constant background temperature and a second heater can be used to provide the temperature transients used to expand working fluid 300. In some applications, both the first and second heaters are of the same type, for example PTC elements, while in other embodiments a combination of heating devices, and as will be discussed cooling devices, can be employed.

Figure 3:
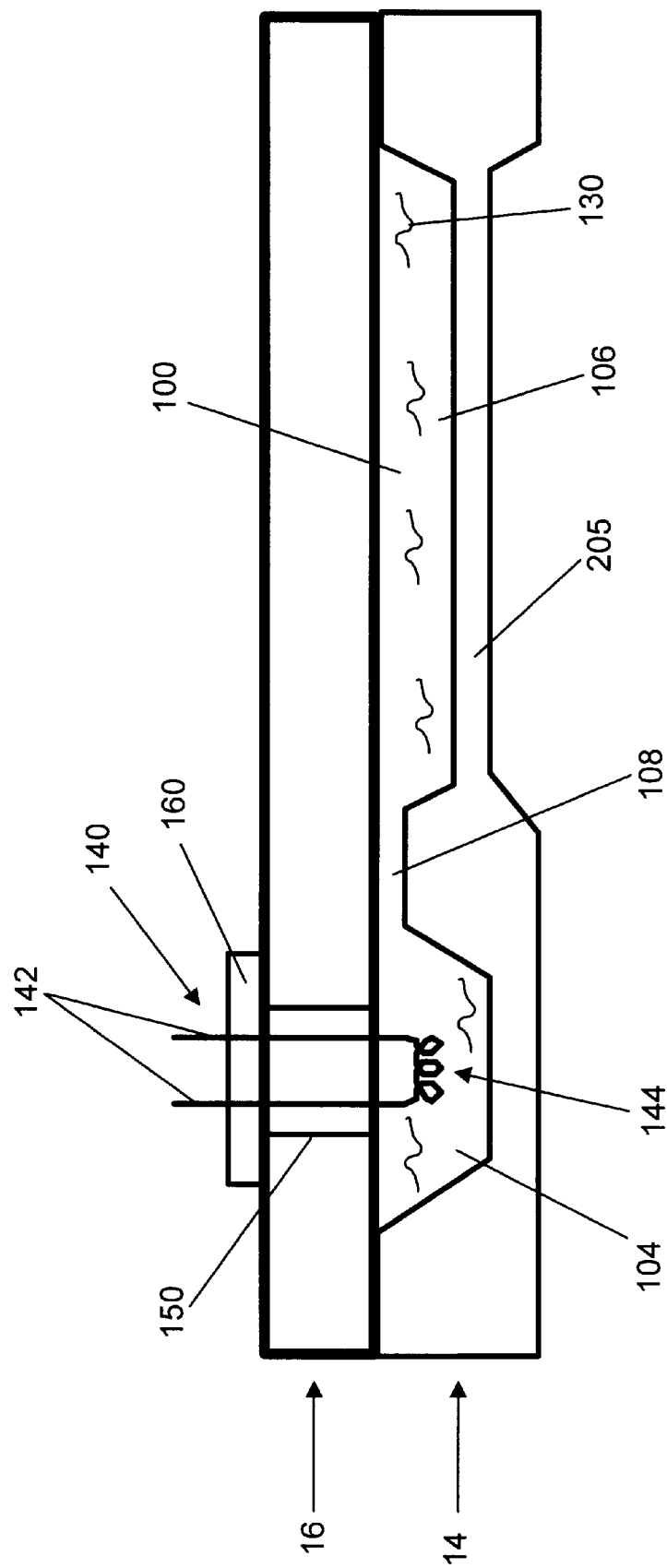
FIG. 3 is a cross-sectional view of an alternate cavity and heater configuration in accordance with the present invention.

As mentioned previously, heating elements 120 are one portion of an energy conversion block that, in the embodiment shown in FIG. 2, converts electrical energy to heat which is converted to mechanical motion. Turning now to FIG. 3, an alternate embodiment of this energy conversion block is depicted. For ease of understanding, only those portions of upper layer 16 and middle layer 14 necessary to describe the embodiment of FIG. 3 are shown. Cavity 100 is seen having a first portion 104 and a second portion 106 adjacent flexible membrane 205. As depicted, first portion 104 is smaller than second portion 106, and has an insertable heating element 140 inserted through port 150. Port 150 is sealed with sealing element 160 to hold heating element 140 in position and to hermetically seal cavity 100.

While the embodiment of FIG. 3 shows cavity 100 having two portions, in other embodiments cavity 100 can have a single portion as depicted in FIG. 2. However, it has been found to be advantageous, when an insertable heating element 140 is employed, to use a two-portion cavity 100 where first portion 104 is a small heating portion 104. In this manner, fluid 130 within portion 104 is heated at a very high rate causing fluid 130 to rapidly expand. Expanding fluid 130 from heating portion 104 then pushes through channel 108 into portion 106 increasing the volume of fluid 130 in portion 106 and thus causing flexible membrane 205 to deflect. This essentially hydraulic action thus advantageously results in rapid, controllable movement of membrane 205.

Heating element 140 is shown having two conductors 142, passing through sealing port 150 to terminate within portion 104 with several loops 144. It will be understood, that many configurations of heating element 140 are possible and that the configuration depicted is for illustrative purposes only. It will also be understood, that many different materials can be employed for the part of element 140. For example, conductors 142 can be a first material having a low resistance and loops 144 a second material having a high resistance, or the same material can be employed for both. Conductors 142 can be mounted in a support structure (not shown) or as depicted, sealing element 160 can be employed as a support structure. In addition, a variety of materials having different heating characteristics or capacities can be used to form loops 144. In addition, configuration other than loops 144 can be employed to provide a specific amount of surface area for heating fluid 130 in portion 104. Thus, in some embodiments of the present invention, an insertable heating element 140 is used that provides a temperature higher than the boiling point of the specific fluid 130 employed. In this manner, spot vaporization of fluid 130 creates bubbles. It has been found that in some applications, formation of such bubbles advantageously enhances control of the deflection of a specific flexible membrane 205 or 200 (FIG. 2). Thus, any number of identical valves 50 can be fabricated together and by selecting different insertable heating elements 140 for each valve 50, valves suitable for differing applications can be provided.

Figure 4:
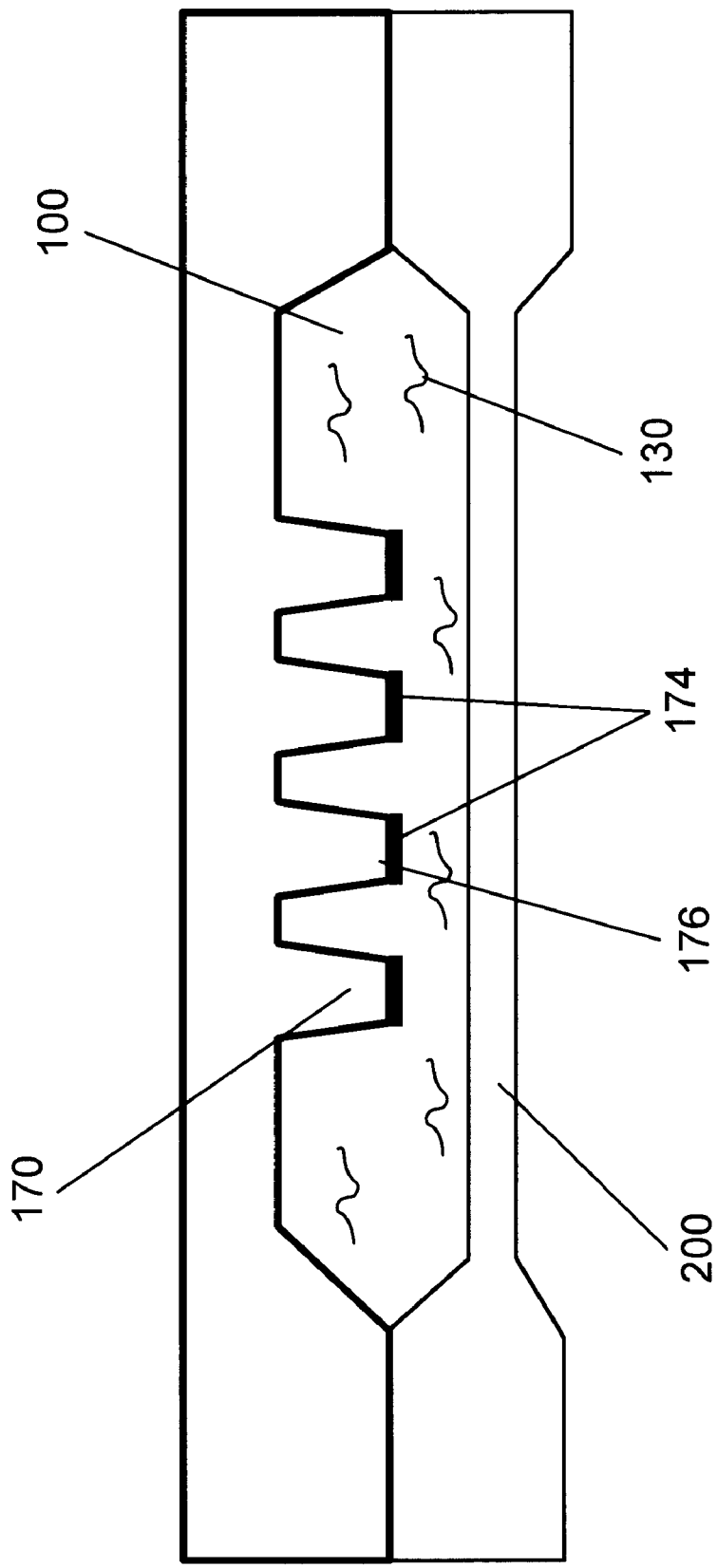
FIG. 4 is a cross-sectional view of another alternate cavity and heater configuration in accordance with the present invention.

Turning now to FIG. 4, another alternative heater and cavity configuration is shown. Unlike the embodiment of FIG. 2, the embodiment of FIG. 4 has an upper layer 16 formed having extensions 170 with heating elements or enhancements 174 formed at an end 176 of each extension 170. In this manner, the heating effect caused by elements 174 is moved closer to flexible membrane 200 at a central part of cavity 100, and more uniform heating of fluid 130 realized. Thus, an efficient conversion of the energy used to heat fluid 130 into mechanical movement of membrane 200 is obtained. In addition, extensions 170 serve to increase the surface area of layer 16 in contact with working fluid 130. Thus cooling of fluid 130 through heat dissipation through layer 16 is enhanced. Where layer 16 has extensions 170, typically a silicon material is selected for layer 16 and extensions 170 are formed using, for example, silicon micromachining methods. However, other appropriate materials and methods of fabrication for extensions 170 can be employed, for example extensions 170 can be independently formed and mounted in cavity 100. Heating elements or enhancements 174 can be similar in structure to heating elements 120 (FIG. 2), previously described. Alternatively, elements 174 can be doped silicon regions formed using diffusion or ion implantation methods familiar to those of ordinary skill in the art. Additionally, the length and shape of extensions 170 can be varied to place elements 174 in an optimum position and or to vary the surface area available for cooling fluid 130.

In FIG. 5A a planar view of a portion of yet another embodiment of an alternative energy conversion block is depicted. A heating layer 180 is shown having three heating members 182. In some embodiments, heating layer 180 is a [111] silicon material to take advantage of preferential etching along crystal planes. Thus, heating members 182 are formed by etching layer 180 from opposing sides to remove all of the silicon in regions 184 to leave silicon connecting regions 186 for mechanical and electrical coupling and form the essentially hexagon shaped elements depicted. However, other shapes for heating members 182 are possible, and other methods of forming these alternate shapes, such as those described for forming other portions of valve 50, can be employed.

Turning to FIG. 5B, a cross-sectional view, taken through line B–B', of an alternate cavity and heater configuration encompassing layer 180 is shown. Cavity 100 is formed having heating layer 180 between upper layer 16 and middle layer 14. Using heating layer 180 in this manner, positions heating members 182 within cavity 100 to provide significant heating surface area throughout essentially all of cavity 100. In this manner, working fluid 130 is rapidly heated and through the expansion of fluid 130, flexible membrane 200 is deflected.

It will be understood, that the embodiments of FIGS. 2 through 5B are only illustrative of the various types of heating elements that are encompassed by the present invention. Thus, substitution of other types or configurations of heating elements, as are known, for the heating elements depicted, are design choice modifications within the scope of the present invention. For example, in some embodiments of the present invention, heating is supplied by elements (not shown) mounted outside of cavity 100 and not in direct contact with fluid 130, e.g. on surface 110 (FIG. 2) of layer 16 above cavity 100. In addition, while the illustrative embodiments of FIGS. 2 through 5B refer only to heating elements, other configurations are possible. Thus some embodiments of the present invention advantageously provide both positive heating and positive cooling of fluid 130. For example, an embodiment having both positive heating and cooling capability can be formed by mounting a Peltier heat pump to surface 110 above cavity 100. In this manner, cooling can be enhanced.

Figure 6:
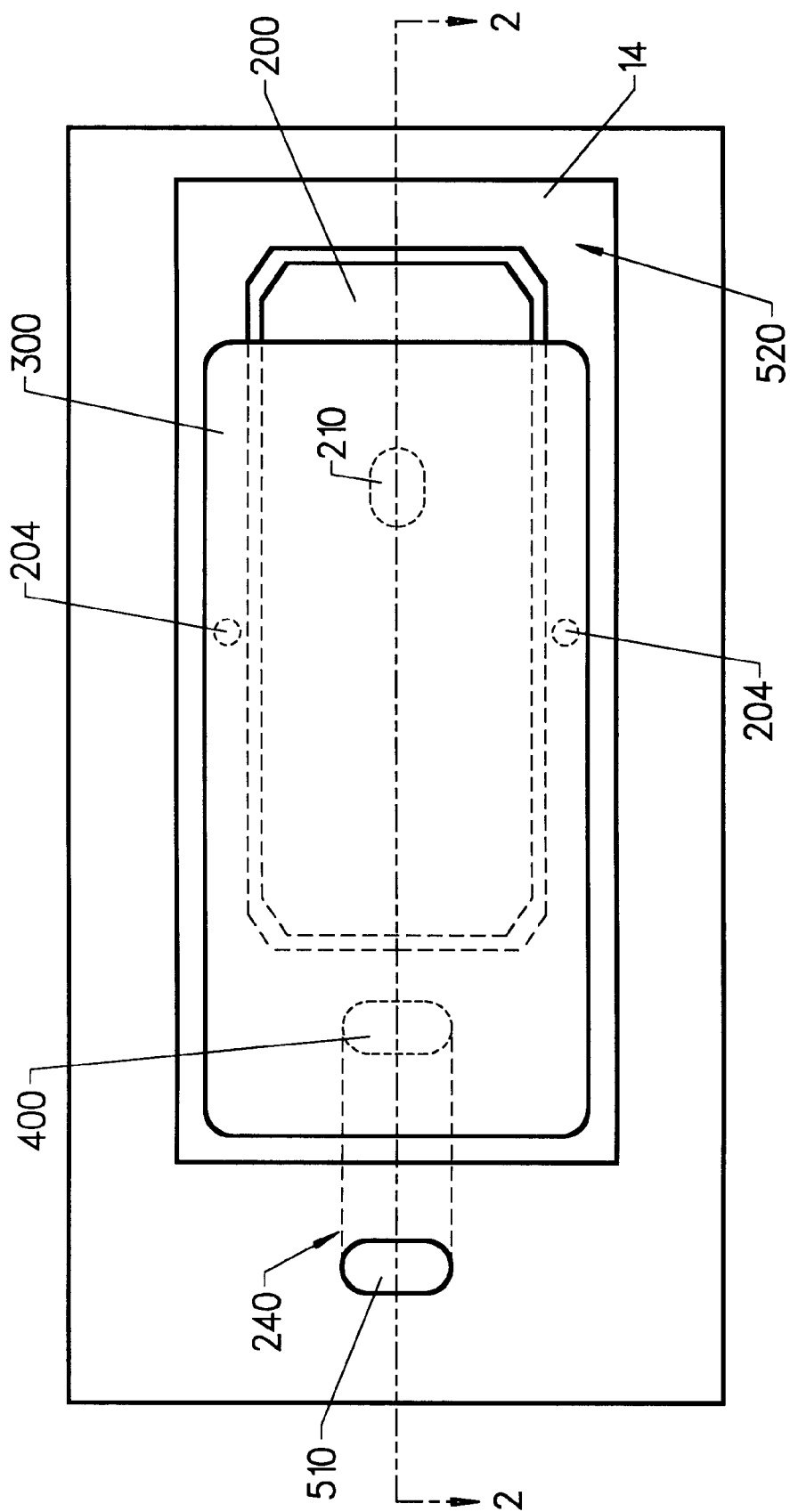
FIG. 6 is a planar view of the embodiment of FIG. 2.

Valve element 300 is one portion of the intermediary valve block that, in the embodiment of the present invention depicted in FIG. 2, seals valve port 400. Turning now to FIG. 6, a planar view of element 300 is shown looking at lower layer 12 through to layer 14. Sectional line C–C' indicates the position of the view given in FIG. 2. As lower valve element 300 and portions of layer 12 obscure portions of middle layer 14 and structures formed using layer 14, these obscured structures, where identified, will be shown using dashed lines. Valve element 300, having an essentially rectangular shape, is positioned overlying a portion of flexible membrane 200. Optional planarity posts 304 can be formed and positioned between layers 14 and 12 at element 300 to enhance planarity between element 300 and layer 14. A small portion of flexible membrane 200, visible through inlet port 520, is shown with solid lines. Outlet port 510 is shown formed in layer 12 and fluidically coupled by channel 240 to intermediary port 400. Element 300 is mounted to pedestal 210 such that deflection of membrane 200 will cause pedestal 210 to push on element 300 and open port 400 or pull on element 300 to close port 400.

Figure 7:
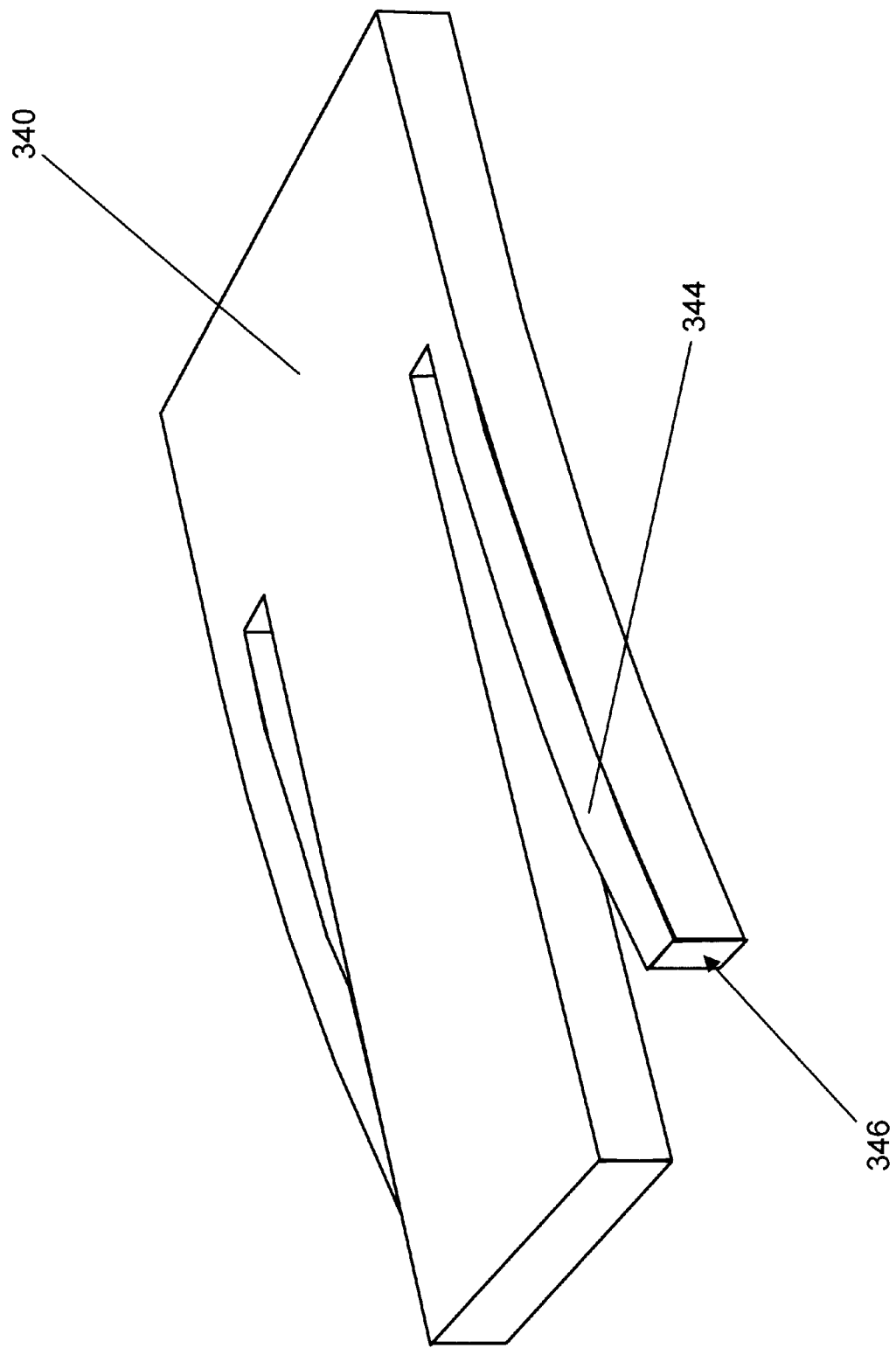
FIG. 7 is a view of an another embodiment of a valve element in accordance with the present invention.

In other embodiments of the present invention, alternative configurations of valve element 300 are employed to help tailor the performance of valve 50 to specific applications. In FIG. 7, an alternate embodiment of valve element 300 (FIG. 2) is shown that provides addition valve closing force by a modification of the valve element. Thus, valve element 340 is shown having beams 344 formed on opposing sides. Each beam 344 has a free end 346 that is fixably mounted to a non-movable portion of valve 50. For example, mounting can be to layer 14 adjacent to flexible membrane 200 or to a portion of layer 12 (FIG. 2). Thus as element 340 is deflected from its resting position, a restoring force is created within each beams 344. As the amount of this force increases as the deflection of element 340 increases, the amount of force available is controlled by varying the length, width, position and shape of beams 344.

Figure 8B:
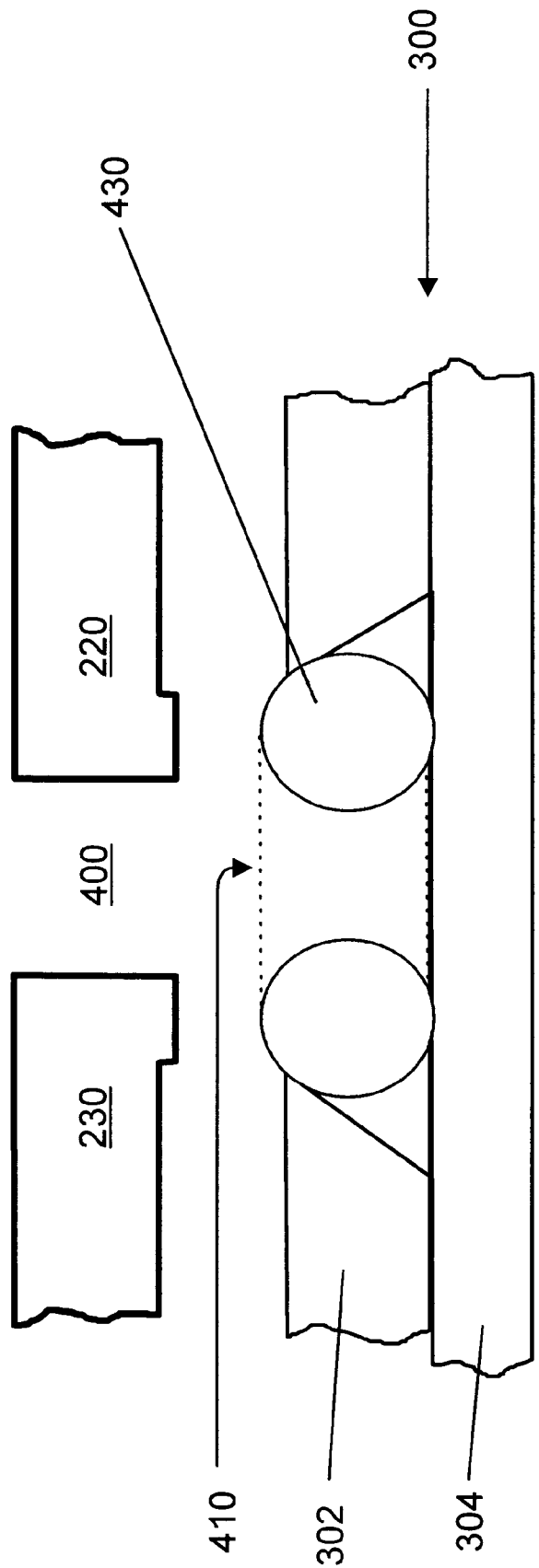

Another alternative configuration of valve element 300 is shown in FIG. 8A. For ease of understanding, only the region about port 400 is shown. Valve seat area 410 is formed in valve member 300 using a compliant material 420. The specific compliant material 420 selected can vary for each specific application. Thus, in some applications material 420 is a plastic material, in other applications a fluorocarbon and in yet others a metal material can be employed. Material 420 can be a molded material having one of more raised portions 425, as depicted, or ridges (not shown) can be formed on the sealing surfaces of portions 220 and 230. In some embodiments, both ridges and raised portions 425 are employed. Looking now to FIG. 8B, an o-ring 430 is advantageously used in another embodiment of the present invention. As depicted, o-ring 430 is captured by element 300 to form valve seat area 410, for example by using a two part valve element 300 having a shaped upper portion 302 and an essentially flat lower portion 304 in a manner similar to that depicted in FIG. 8A. In other embodiments, not shown, an o-ring can be captured by grooves formed in portions 220 and 230 to form an alternate valve seat area 410. Thus, when valve port 400 is closed against either compliant material 420 (FIG. 8A) or compliant o-ring 430 (FIG. 8B) an enhanced seal of port 400 is provided. This enhanced seal can advantageously be employed for applications requiring low leak rates. It has been found that use of o-ring 430 as depicted in FIG. 8B, or compliant material 420 having raised portions 425 as depicted in FIG. 8A, or any other such appropriate structure to form valve seat area 410, advantageously allows leak rates of from $1 \times 10^{-6}$ to less than $1 \times 10^{-9}$ cc-Atm/sec of He to be achieved.

Figure 9:
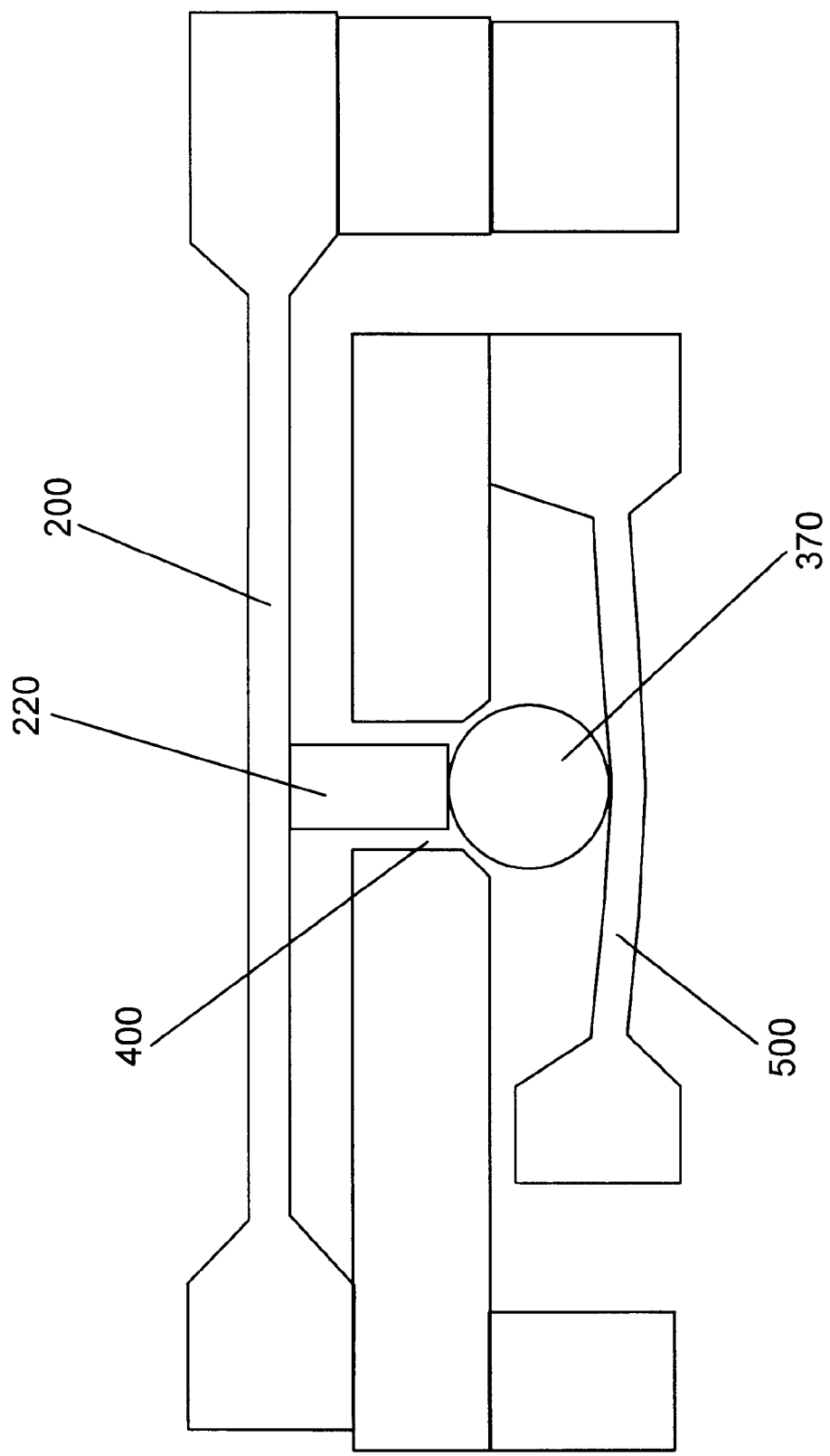
FIG. 9 is a cross-sectional view of another alternate intermediary port configuration in accordance with the present invention.

Turning now to FIG. 9, another alternate embodiment of a valve element in accordance with the present invention is shown. As shown, flexible membrane 200 has a membrane extension 220 that extends partially through port 400 to contact a spherical valve element 330. Spherical element 330 is positioned overlying a spring-like membrane 500. Thus, it can be seen that when membrane 200 deflects, spherical element 330 is pushed out of contact with valve seat 410 by extension 220 and fluidic communication through port 400 enabled. As movement of spherical element 330 from seat 410 deflects spring-like membrane 500, a port closing force is created. This port closing force provided by membrane 500, is equivalent to the closing force of valve member 340 provided, for example, by beams 344 of FIG. 7. Spherical element 330 can be formed of a hard, essentially non-compressible material, or element 330 can have some degree of compliance. In a similar manner, valve seat 410 can be either compliant or not. A variety of configurations (not shown) of the embodiment of FIG. 9 are possible and within the scope of the present invention. Thus, valve element 330 can have a non-spherical shape, for example a conical shape or other appropriate shape that can be used to seal port 400. In addition, where a combination of hard and compliant materials are employed for sealing element 330 and valve seat 410, low leak rates can also be obtained.

Referring now to FIG. 10, another embodiment of a valve element and valve seat in accordance with embodiments of the present invention is shown. A poppet type valve element 360 is used to seal intermediary port 400. Valve element 360 has indentations 362 that serve to capture an o-ring 364 or other compliant material for sealing port 400. Port 400 is sealed by allowing o-ring 364 to come into contact with a valve seat area 414 formed about the periphery of port 400, as depicted. The movement of poppet valve element 360 is accomplished in a manner similar to that of spherical element 330 described in FIG. 9. Thus, flexible membrane 200 has a membrane extension 224 that contacts an upper portion 368 of poppet valve element 360. It will be realized that the specific configuration depicted is for illustrative purposes only, and that other configurations of a poppet type of valve element are possible. In addition, while o-ring 364 is depicted captured within element 360, in some embodiments, o-rings 364 are captured with valve seat area 414. Configurations of poppet valve element 360 can also be formed with restoring force devices, for example a device formed in the manner of device 500 (FIG. 9). Additionally, where a combination of hard and compliant materials are employed for poppet element 360 and valve seat 414, low leak rates can also be obtained.

As one of ordinary skill in the art of valves will realize, many variations, in addition to the examples herein, of valve seats and valve elements are known. Thus, it would be impractical to describe each configuration. In addition, it will be realized that methods described herein, incorporated by reference from the "Zdeblick" patents as well as other known methods, can be employed to fabricate these configurations of valve elements and valve seats. Thus, it is understood that these various configurations of compliant and/or non-compliant valve seats and valve elements used in various combinations are intended to be within the scope of the present invention.

As seen, the use of compressed compliant materials has been found to enhance sealing of port 400 and lower leak rates. However, this enhanced sealing capability can also require a restoring or closing force be applied to compress the compliant materials. In the embodiment of FIG. 9 spring-like membrane 500 was employed to provide this force. However, in other embodiments other force-providing devices are possible. In some embodiments, these other force-providing devices will serve to help close the intermediary port, while in other embodiments force-providing devices are configured to help open the intermediary port.

Figure 11:
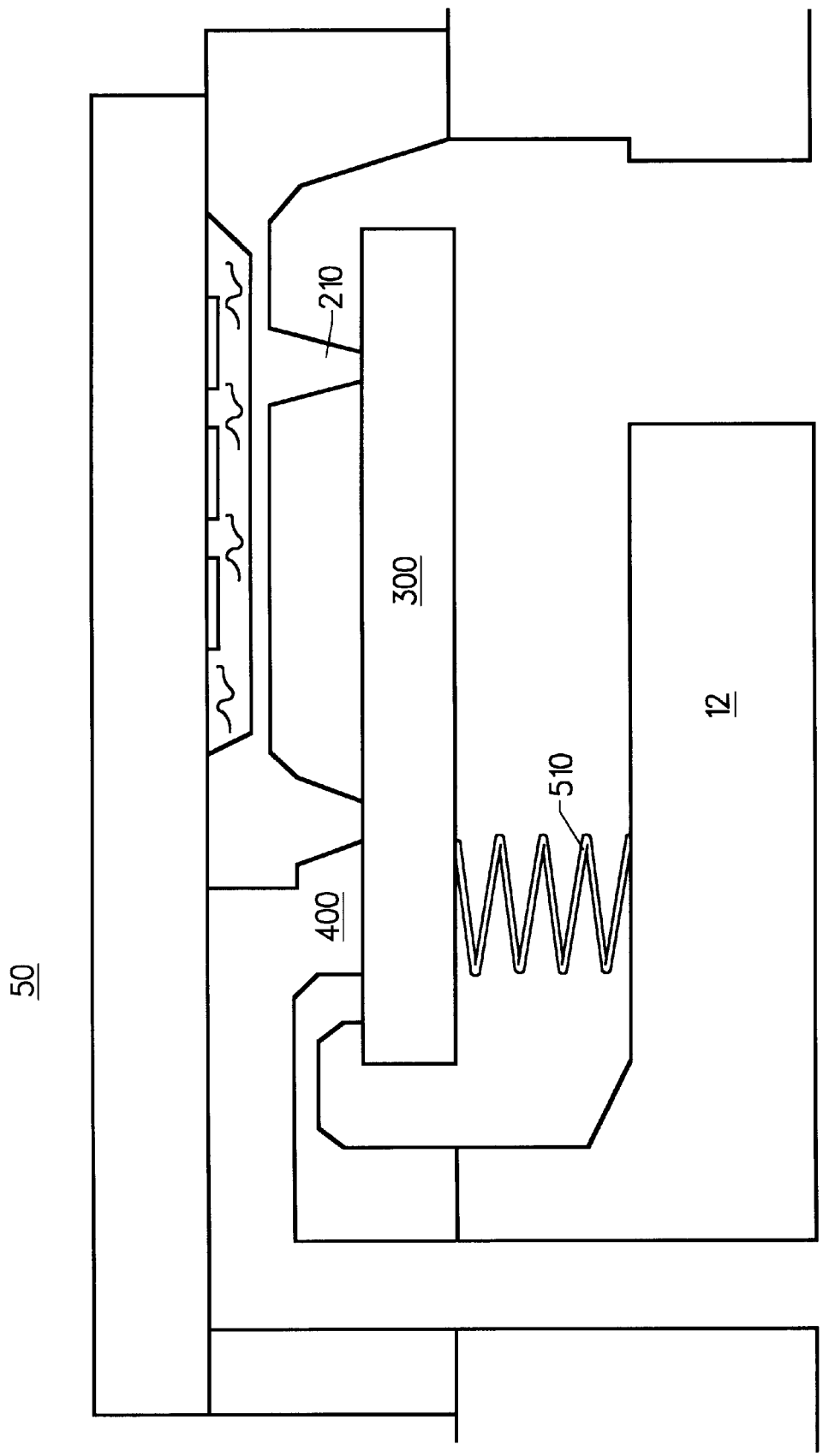
FIG. 11 is a cross sectional view of a normally closed valve embodiment in accordance with the present invention having an optional force providing device.

Turning now to FIG. 11 another embodiment of the present invention is shown where a force-providing device 510 is employed to increase the amount of closing force of valve in accordance with the present invention. As seen, the embodiment of FIG. 11 is essentially that shown in FIG. 2 with the addition of force providing device 510 positioned between valve member 300 and a portion of lower layer 12. In this manner, as pedestal 210 pushes against valve member 300 to open intermediary port 400, force device 510 is compressed and a valve closing force provided by this compression. It will be realized that while device 510 is shown formed in the manner of a coil spring, other configurations are possible. For example, force device 510 can be formed as a leaf spring, torsion bar or other appropriate device. In addition, as described with respect to the embodiment of FIG. 9, use of a separate force-providing device, such as device 500 (FIG. 9) or device 510, allows for greater flexibility in the design of valves to meet specific applications.

In addition to providing a valve closing force through the compression of force providing device 510, as described above, a valve opening force can also be supplied. For applications when pressure in channel 540 is much larger than pressure in channel 240, the force supplied by membrane 200 may not, by itself, be sufficient to open intermediary port 400. Thus, in some embodiments of the present invention, force providing device 510 is provided in a tensile state when port 400 is closed. In this manner, device 510 provides an opening force that is controlled by movement of membrane 200.

By now it will be realized that a variety of embodiments of an integrated, electrically operable micro-valve have been described. It will also be realized that these various embodiments include combinations of the alternate embodiments of the elements of the micro-valve described. Thus, where the ability to control corrosive fluids is also required to have low leak rates, various combinations of compliant valve seat materials, ridge-like structures and/or force providing devices can be employed, thus providing a wide range of micro-valves in accordance with the present invention. In addition, it will be realized that this flexibility to design a specific embodiment of a micro-valve for a specific application is a function, among other things, of the functional block design of those embodiments. Thus unlike the prior art valves described in the "Zdeblick" patents, micro-valves in accordance with the present invention offer, for example, low leak rate embodiments that do not require modifications to the flexible membrane as the flexible membrane is not used to directly seal the valve port. On the other hand, this functional block design provides for the incorporation of energy conversion blocks that have insertable heating elements 140 (FIG. 3). Thus, micro-valves in accordance with the present invention can be fabricated in bulk and tailored for specific applications by varying the type of heater element 140 employed. In this manner, manufacturing costs can be lowered while maintaining significant flexibility to provide for a broad range of applications.

While the specific examples of embodiments of the present invention discussed hereto have shown a normally closed valve 50, normally open configurations of those embodiments will be apparent to those of ordinary skill in the art. For example, the valve depicted in FIG. 2 can be fabricated as a normally open valve, in significant part, by sealing cavity 100 at a temperature less than the operating range of the valve. In this manner, as the valve is warmed to operating temperature, flexible membrane 200 will deflect and cause intermediary port 400 to open. Thus to close such a valve, working fluid 130 is cooled, for example a Peltier heat pump, as previously described, can be employed to provide such cooling.

It should also be apparent that valves fabricated in accordance with the present invention can be stand-alone valves or valves that are coupled to any one of a variety of flow sensing devices known in the art. In addition, it should be apparent that the micro-valves of the present invention can be opened or closed to varying degrees. Thus valves made in accordance with the present invention can not only provide either flow or no-flow of a fluid, but can control the amount of flow of that fluid over a continuous range of flow rates. Control of fluid flow rate is obtained, for example, by varying the amount of energy converted to mechanical energy by the energy conversion block. In this manner, the position of the valve element is varied in proportion to the amount of deflection from the de-energized state. Thus, embodiments of the present invention can incorporate an integrated flow or pressure sensing apparatus that can provide dynamic feedback to the valve to dynamically control the flow rate or pressure provided. Where the sensing apparatus is used to sense flow rate, the micro-valve is commonly referred to as a flow controller, and where the apparatus determines pressure, the micro-valve is commonly referred to as a pressure controller. For example, a flow controller, in accordance with the present invention, can encompass a flow sensing apparatus having a first pressure sensor, a flow restrictor and a second pressure sensor where the pressure drop across the restrictor is measured. As known, for a predetermined flow restriction the pressure drop can be accurately calibrated to the flow rate for a specific fluid. Thus the flow sensing apparatus, as described, provides dynamic control of flow rate for the specific fluid selected.

What is claimed is:

1. A micro-valve, comprising:

a fluid guiding structure containing a fluid inlet port and a fluid outlet port;

a fluid communication channel, formed within said fluid guiding structure, fluidically coupling said fluid inlet port to said fluid outlet port;

an intermediary port, formed within said fluid communication channel, said fluid inlet port being fluidically coupled to said fluid outlet port valve through said intermediary port;

a valve element, moveably positioned proximate to said intermediary port within said fluid communication channel;

an energy conversion body defining a chamber enclosing a working fluid, said energy conversion body being at least partially formed of a semiconductor material, said energy conversion body including a flexible membrane mechanically coupled to said valve element; and a heater positioned within said chamber of said energy conversion body, said heater being positioned on a suspension structure that places said heater at approximately the center of said chamber, said heater selectively controlling the volume occupied by said working fluid, thereby providing for movement of said valve element in response to said flexible membrane to control fluid passage through said intermediary port.

2. The micro-valve of claim 1 wherein said heater is positioned on a suspension structure in the form of a wire protruding from an outer perimeter wall of said chamber.

3. The micro-valve of claim 1 wherein said heater is positioned on a suspension structure in the form of an extension structure protruding from an outer perimeter wall of said chamber.

4. The micro-valve of claim 1 further comprising a force-providing device connected to said valve element, said force-providing device biasing said valve element toward said intermediary port.

5. The micro-valve of claim 1 further comprising an inert material positioned on said fluid communication channel.

6. The micro-valve of claim 1 wherein said energy conversion body includes a first region defined by said flexible member and a second region, outside of said first region, with said heater positioned therein.

7. The micro-valve of claim 1 wherein said valve element includes a set of beams operative as a restoring force during deflection of said valve element by said flexible membrane.

8. A micro-valve, comprising:

a fluid guiding structure containing a fluid inlet port and a fluid outlet port;

a fluid communication channel, formed within said fluid guiding structure, fluidically coupling said fluid inlet port to said fluid outlet port;

an intermediary port, formed within said fluid communication channel, said fluid inlet port being fluidically coupled to said fluid outlet port valve through said intermediary port;

a valve element, moveably positioned proximate to said intermediary port within said fluid communication channel;

an energy conversion body defining a chamber enclosing a working fluid, said energy conversion body being at least partially formed of a semiconductor material, said energy conversion body including a flexible membrane mechanically coupled to said valve element; and a thermal control unit positioned on top of said energy conversion body, said thermal control unit selectively controlling the volume occupied by said working fluid, thereby providing for movement of said valve element in response to said flexible membrane to control fluid passage through said intermediary port.

9. The micro-valve of claim 8 wherein said thermal control unit is a Peltier heat pump.

10. The micro-valve of claim 8 further comprising a force-providing device connected to said valve element, said force-providing device biasing said valve element toward said intermediary port.

11. The micro-valve of claim 8 further comprising an inert material positioned on said fluid communication channel.

12. The micro-valve of claim 9 wherein said valve element includes a set of beams operative as a restoring force during deflection of said valve element by said flexible membrane.

* * * * *